United States Patent
Kanekiyo et al.

(10) Patent No.: US 7,842,140 B2
(45) Date of Patent: Nov. 30, 2010

(54) IRON-BASED RARE-EARTH NANOCOMPOSITE MAGNET AND METHOD FOR PRODUCING THE MAGNET

(75) Inventors: Hirokazu Kanekiyo, Kyoto (JP); Toshio Miyoshi, Mishima-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 1131 days.

(21) Appl. No.: 10/596,880

(22) PCT Filed: Dec. 13, 2005

(86) PCT No.: PCT/JP2005/022857

§ 371 (c)(1),
(2), (4) Date: Jun. 28, 2006

(87) PCT Pub. No.: WO2006/064794

PCT Pub. Date: Jun. 22, 2006

(65) Prior Publication Data

US 2009/0223606 A1   Sep. 10, 2009

(30) Foreign Application Priority Data

Dec. 16, 2004   (JP) .............................. 2004-364544

(51) Int. Cl.
*H01F 1/053* (2006.01)
*H01F 1/057* (2006.01)

(52) U.S. Cl. ...................... 148/302; 148/301; 148/121; 148/101

(58) Field of Classification Search .................... None
See application file for complete search history.

(56) References Cited

U.S. PATENT DOCUMENTS 5,872,501 A   2/1999   Hamano et al.

(Continued)

FOREIGN PATENT DOCUMENTS

EP   1 207 537 A1   5/2002

(Continued)

OTHER PUBLICATIONS

Official communication issued in counterpart Japanese Application No. 2006-519681, mailed on Mar. 18, 2008.

(Continued)

*Primary Examiner*—John P Sheehan
(74) *Attorney, Agent, or Firm*—Keating & Bennett, LLP

(57) ABSTRACT

The iron-based rare-earth nanocomposite magnet of the present invention has a composition $T_{100-x-y-z-n}Q_xR_yTi_zM_n$, where T is Fe or a transition metal element in which Fe is partially replaced by Co and/or Ni; Q is B and/or C; R is at least one rare-earth element including substantially no La or Ce; and M is at least one metal element selected from Al, Si, V, Cr, Mn, Cu, Zn, Ga, Zr, Nb, Mo, Ag, Hf, Ta, W, Pt, Au and Pb. x, y, z and n satisfy $5 \leq x \leq 10$ at %, $7 \leq y \leq 10$ at %, $0.1 \leq z \leq 5$ at % and $0 \leq n \leq 10$ at %, respectively. The magnet includes $R_2Fe_{14}B$-type compound phases and α—Fe phases forming a magnetically coupled nanocomposite magnet structure. The $R_2Fe_{14}B$-type compound phases have an average crystal grain size of 30 nm to 300 nm and the α—Fe phases have an average crystal grain size of 1 nm to 20 nm. The magnet has magnetic properties including a coercivity of at least 400 kA/m and a remanence of at least 0.9 T.

7 Claims, 3 Drawing Sheets

U.S. PATENT DOCUMENTS

| | | |
|---|---|---|
| 6,183,571 B1 | 2/2001 | Inoue et al. |
| 6,695,929 B2 | 2/2004 | Kanekiyo et al. |
| 6,706,124 B2 | 3/2004 | Kanekiyo et al. |
| 2002/0003006 A1 | 1/2002 | Nishimoto et al. |
| 2002/0036559 A1 | 3/2002 | Waki et al. |
| 2003/0062097 A1 | 4/2003 | Shimada et al. |
| 2004/0020569 A1* | 2/2004 | Kanekiyo et al. ........... 148/302 |
| 2004/0051614 A1* | 3/2004 | Kanekiyo et al. ........... 335/302 |
| 2004/0067154 A1 | 4/2004 | Kanekiyo |
| 2004/0099346 A1* | 5/2004 | Nishiuchi et al. ........... 148/302 |
| 2004/0194856 A1* | 10/2004 | Miyoshi et al. ............. 148/105 |

FOREIGN PATENT DOCUMENTS

| | | |
|---|---|---|
| JP | 08-162312 A | 6/1996 |
| JP | 10-53844 A | 2/1998 |
| JP | 2000-286114 A | 10/2000 |
| JP | 2001-244105 A | 9/2001 |
| JP | 2001-319821 A | 11/2001 |
| JP | 3264664 B | 12/2001 |
| JP | 2002-100507 A | 4/2002 |
| JP | 2002-343659 A | 11/2002 |
| JP | 2003-158008 A | 5/2003 |
| JP | 2003-286548 A | 10/2003 |
| JP | 2004-14906 A | 1/2004 |
| JP | 2004-122230 A | 4/2004 |
| JP | 2004-235508 A | 8/2004 |
| JP | 2004-306054 A | 11/2004 |

OTHER PUBLICATIONS

Official Communication issued in the corresponding International Application No. PCT/JP2005/022857, mailed on Jan. 24, 2006.
Official communication issued in the counterpart International Application No. PCT/JP2005/022857, mailed on Jun. 28, 2007.
Official Communication issued in the corresponding European Patent Application No. 05816736.2, mailed on Apr. 1, 2010.
Chang et al., "The Effects of Refractory Metals on the Magnetic Properties of $\alpha$-Fe/R2Fe14B-Type Nanocomposites", IEEE Transaction on Magnetics, Sep. 1999, vol. 35 No. 5, pp. 3265-3267.

* cited by examiner

FIG.2
(a)
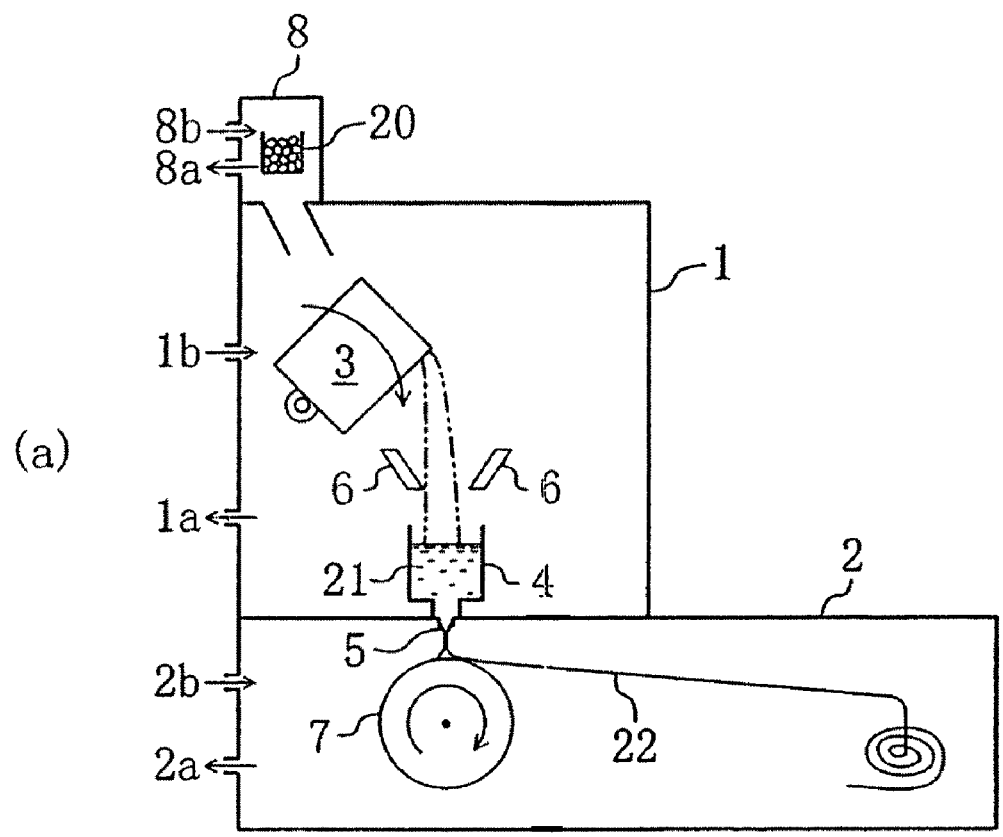
(b)
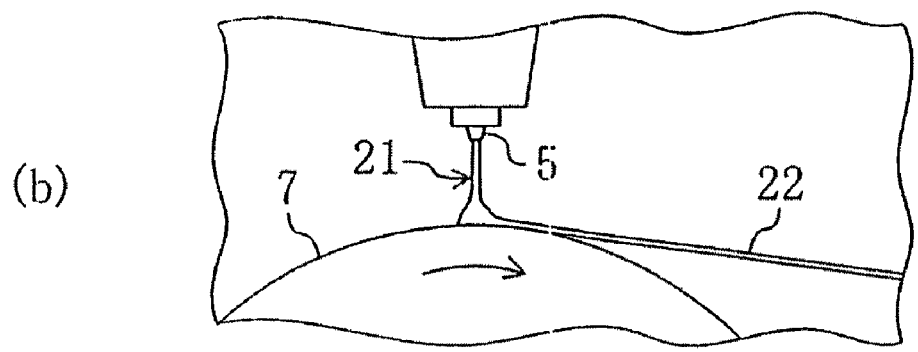

IRON-BASED RARE-EARTH NANOCOMPOSITE MAGNET AND METHOD FOR PRODUCING THE MAGNET

BACKGROUND OF THE INVENTION

1. Field of the Invention

The present invention relates to an iron-based rare-earth nanocomposite magnet and a method for producing such a magnet. The present invention also relates to a rapidly solidified alloy to make an iron-based rare-earth nanocomposite magnet and to a bonded magnet including an iron-based rare-earth nanocomposite magnet powder.

2. Description of the Related Art

A nanocomposite permanent magnet, having a nanocrystalline structure in which a hard magnetic phase such as $Nd_2Fe_{14}B_1$ phase (which will be sometimes referred to herein as a "2-14-1 phase") and soft magnetic phases such as an iron-based boride and $\alpha$-Fe are magnetically coupled together, is currently under development. In the "2-14-1 phase", Nd may be replaced with any other rare-earth element, Fe may be partially replaced with Co and/or Ni, and B may also be partially replaced with C (carbon).

The applicant of the present application discovered that when Ti was added to an alloy with a particular composition, the nucleation and growth of the $\alpha$—Fe phase could be restricted and the crystal growth of the 2-14-1 phase could be advanced preferentially while the molten alloy was being cooled. And the applicant of the present application disclosed a nanocomposite magnet, having a structure in which the 2-14-1 phase is distributed uniformly in the fine iron-based boride and $\alpha$—Fe phases as a result of the addition of Ti, and a method for producing such a magnet in Patent Document No. 1.

The Ti-containing nanocomposite magnet disclosed in Patent Document No. 1, of which the soft magnetic phases are mostly iron-based borides, has a coercivity of about 500 kA/m to about 1,000 kA/m, which is extremely high for a nanocomposite magnet, but can exhibit a remanence of at most about 0.9 T.

Recently, in the field of electronic products including small-sized motors and sensors, magnets that have a higher remanence than the magnet disclosed in Patent Document No. 1 are in high demand. To increase the remanence, the percentage of the $\alpha$—Fe phase, having a higher saturation flux density than the 2-14-1 phase or the Fe—B phase, may be increased.

Patent Documents Nos. 2 and 3 disclose rare-earth nanocomposite magnets including $\alpha$—Fe as their main phase. A nanocomposite magnet of that type would achieve a high remanence exceeding 0.9 T.

Patent Document No. 1: Japanese Patent No. 3264664
Patent Document No. 2: Japanese Patent Application Laid-Open Publication No. 8-162312
Patent Document No. 3: Japanese Patent Application Laid-Open Publication No. 10-53844

However, the conventional $\alpha$—Fe based nanocomposite magnets disclosed in Patent Documents Nos. 2 and 3 have such a low coercivity of 400 kA/m or less that it is difficult to actually use such magnets in various products.

SUMMARY OF THE INVENTION

In order to overcome the problems described above, an object of the present invention is to provide an iron-based rare-earth nanocomposite magnet exhibiting magnetic properties including a coercivity of at least 400 kA/m and a remanence of at least 0.9 T.

Another object of the present invention is to provide a rapidly solidified alloy to make such an iron-based rare-earth nanocomposite magnet and a powder of the iron-based rare-earth nanocomposite magnet.

An iron-based rare-earth nanocomposite magnet according to the present invention has a composition represented by the general formula: $T_{100-x-y-z-n}Q_xR_yTi_zM_n$, where T is either Fe alone or a transition metal element in which Fe is partially replaced by at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb. The mole fractions x, y, z and n satisfy the inequalities of 5 at %$\leq$x$\leq$10 at %, 7 at %$\leq$y$\leq$10 at %, 0.1 at %$\leq$z$\leq$5 at % and 0 at %$\leq$n$\leq$10 at %, respectively. The magnet includes $R_2Fe_{14}B$-type compound phases and $\alpha$—Fe phases that form a magnetically coupled nanocomposite magnet structure. The $R_2Fe_{14}B$-type compound phases have an average crystal grain size of 20 nm or more and the $\alpha$—Fe phases are present in a grain boundary region between the $R_2Fe_{14}B$-type compound phases and have a thickness of 20 nm or less. The magnet has magnetic properties including a coercivity of at least 400 kA/m and a remanence of at least 0.9 T.

In one preferred embodiment, the $R_2Fe_{14}B$-type compound phases have an average crystal grain size of 30 nm to 300 nm and the $\alpha$—Fe phases have an average crystal grain size of 1 nm to 20 nm.

In another preferred embodiment, the ratio of the average crystal grain size of the $R_2Fe_{14}B$-type compound phases to that of the $\alpha$—Fe phases is 2.0 or more.

In still another preferred embodiment, the $\alpha$—Fe phases are present at grain boundary triple points of the $R_2Fe_{14}B$-type compound phases.

In yet another preferred embodiment, the $\alpha$—Fe phases account for at least 5 vol % of the overall magnet.

A rapidly solidified alloy to make an iron-based rare-earth nanocomposite magnet according to the present invention has a composition represented by the general formula: $T_{100-x-y-z-n}Q_xR_yTi_zM_n$, where T is either Fe alone or a transition metal element in which Fe is partially replaced by at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb. The mole fractions x, y, z and n satisfy the inequalities of 5 at %$\leq$x$\leq$10 at %, 7 at %$\leq$y$\leq$10 at %, 0.1 at %$\leq$z$\leq$5 at % and 0 at %$\leq$n$\leq$10 at %, respectively. The alloy has an average thickness of 50 μm to 300 μm, and the alloy includes at least 20 vol % of $R_2Fe_{14}B$-type compound phases with an average crystal grain size of 80 nm or less.

In one preferred embodiment, the alloy has a thickness with a standard deviation σ of 5 μm or less.

In this particular preferred embodiment, the alloy includes a crystallized layer at least on a free cooling side thereof.

A bonded magnet according to the present invention includes a powder of the iron-based rare-earth nanocomposite magnet described above.

A method for producing an iron-based rare-earth nanocomposite magnet according to the present invention includes the steps of: preparing a molten alloy having a composition represented by the general formula: $T_{100-x-y-z-n}Q_xR_yTi_zM_n$, where T is either Fe alone or a transition metal element in which Fe is partially replaced by at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb, the mole fractions x, y, z and n satisfying the inequalities of 5 at %$\leq$x$\leq$10 at %, 7 at %$\leq$y$\leq$10 at %, 0.1 at %$\leq$z$\leq$5 at % and 0 at %$\leq$n$\leq$10 at %, respectively; rapidly cooling and solidifying the molten alloy to make a rapidly solidified alloy including at least 20 vol % of $R_2Fe_{14}B$-type compound phases with an average crystal grain size of 80 nm or less; and heating the rapidly solidified alloy, thereby making an iron-based rare-earth nanocomposite magnet including the $R_2Fe_{14}B$-type compound phases and $\alpha$—Fe phases that form a magnetically coupled nanocomposite magnet structure, where the $R_2Fe_{14}B$-type compound phases have an average crystal grain size of 20 nm or more, the $\alpha$—Fe phases are present in a grain boundary region between the $R_2Fe_{14}B$-type compound phases and have a thickness of 20 nm or less, and the magnet has magnetic properties including a coercivity of at least 400 kA/m and a remanence of at least 0.9 T.

In one preferred embodiment, the $R_2Fe_{14}B$-type compound phases have an average crystal grain size of 30 nm to 300 nm and the $\alpha$—Fe phases have an average crystal grain size of 1 nm to 20 nm.

In another preferred embodiment, the step of rapidly cooling includes quenching and solidifying the molten alloy to make a rapidly solidified alloy with an average thickness of 50 μm to 300 μm and with a thickness standard deviation σ of 5 μm or less.

A method of making an iron-based rare-earth nanocomposite magnet powder according to the present invention includes the steps of: preparing a rapidly solidified alloy according to any of the preferred embodiments described above to make an iron-based rare-earth nanocomposite magnet; and pulverizing the rapidly solidified alloy into a magnet powder.

In one preferred embodiment, the method further includes the step of heating the rapidly solidified alloy that has not been pulverized yet or that has already been pulverized, thereby making a magnet powder including $R_2Fe_{14}B$-type compound phases with an average crystal grain size of 30 nm to 300 nm and $\alpha$—Fe phases with an average crystal grain size of 1 nm to 20 nm and exhibiting magnetic properties including a coercivity of 400 kA/m or more and a remanence of 0.9 T or more.

According to the present invention, by adding Ti, the molten alloy can be quenched at a lower melt quenching rate than conventional ones with the nucleation and growth of $\alpha$—Fe restricted. As a result, a rapidly solidified alloy including at least 20 vol % of $R_2Fe_{14}B$-type compound phases with as small an average crystal grain size as 80 nm or less can be obtained without amorphizing the entire as-quenched solidified alloy. Even if such a rapidly solidified alloy is heated and crystallized, Ti can work so as to restrict the excessive growth of the $\alpha$—Fe and to grow the $R_2Fe_{14}B$-type compound phases preferentially. Eventually, the $\alpha$—Fe precipitates on the grain boundary between the $R_2Fe_{14}B$-type compound phases (typically at grain boundary triple points). However, the average crystal grain size of the $\alpha$—Fe phase is 1 nm to 20 nm, which is much smaller than that of the $R_2Fe_{14}B$-type compound phases in the range of 30 nm to 300 nm. As a result, magnetic properties including a coercivity of at least 400 kA/m and a remanence of at least 0.9 T are realized.

BRIEF DESCRIPTION OF DRAWINGS

Portions (a) through (d) of FIG. 1 schematically illustrate the structures of nanocomposite magnets.

FIGS. 2(a) and 2(b) illustrate a melt-quenching machine (melt spinning machine in this example).

DETAILED DESCRIPTION OF PREFERRED EMBODIMENTS

Figure 1:
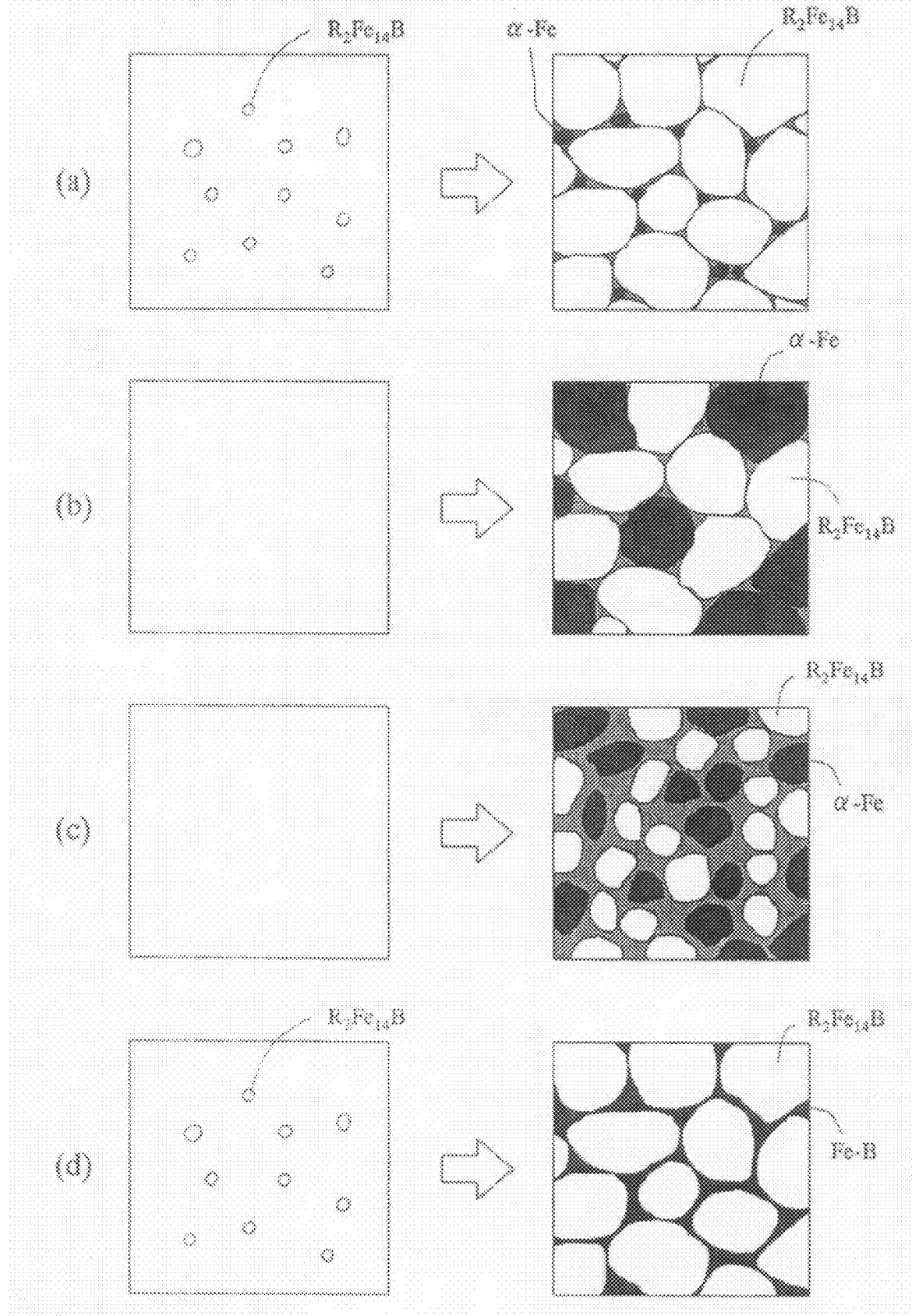

According to the present invention, first, a molten alloy having a composition represented by the general formula: $T_{100-x-y-z-n}Q_xR_yTi_zM_n$ is prepared. In this formula, T is either Fe alone or a transition metal element in which Fe is partially replaced by at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb. The mole fractions x, y, z and n satisfy the inequalities of 5 at %$\leq$x$\leq$10 at %, 7 at %$\leq$y$\leq$10 at %, 0.1 at %$\leq$z$\leq$5 at % and 0 at %$\leq$n$\leq$10 at %, respectively.

Next, the molten alloy with such a composition is rapidly cooled and solidified to make a rapidly solidified alloy including at least 20 vol % of $R_2Fe_{14}B$-type compound phases with an average crystal grain size of 80 nm or less. This process step will be referred to herein as a "rapid cooling process step".

In a conventional $\alpha$—Fe/$R_2Fe_{14}B$ based nanocomposite magnet, the molten alloy is cooled at as high a quenching rate as possible, thereby making a substantially amorphous rapidly solidified alloy. Meanwhile, according to the present invention, the molten alloy is cooled at a relatively low quenching rate, thereby making a rapidly solidified alloy including at least 20 vol % of $R_2Fe_{14}B$-type compound phases with an average crystal grain size of 80 nm or less. If the quenching rate were just decreased without adding Ti, the $\alpha$—Fe would grow faster and earlier than the $R_2Fe_{14}B$-type compound phase. Thus, in the resultant rapidly solidified alloy, the $\alpha$—Fe phase with a greater average crystal grain size than the $R_2Fe_{14}B$-type compound phase would be its main phase, i.e., the volume percentage of the $\alpha$—Fe phase would be higher than that of the $R_2Fe_{14}B$-type compound phase. Also, the size of the $\alpha$—Fe phase is significantly variable with the quenching rate. That is why to produce nanocomposite magnets having excellent magnetic properties with good reproducibility, attempts have been made to form a desired structure with good hard magnetic properties by making an amorphous rapidly solidified alloy once and then controlling the heat treatment conditions.

On the other hand, according to the present invention, not the fully amorphized rapidly solidified alloy but a rapidly solidified alloy, including at least 20 vol % of $R_2Fe_{14}B$-type compound phases with an average crystal grain size of 80 nm or less, is obtained just after the rapid cooling process is finished. The nucleation and the growth of the $\alpha$—Fe are restricted by adding Ti and the volume percentage of the $\alpha$—Fe phase included in the rapidly solidified alloy is smaller than that of the $R_2Fe_{14}B$-type compound phase included there.

In one preferred embodiment, the thicknesses of the rapidly solidified alloys are controlled to have a standard deviation σ of 5 μm or less (i.e., rapidly solidified alloys showing little variation in thickness are obtained), thereby forming a fine metal structure in which the $R_2Fe_{14}B$-type compound phase and the amorphous phase are present uniformly. When the molten alloy is rapidly cooled by the chill roller, the quenching rate achieved by the chill roller varies with the thickness of the rapidly solidified alloy to be obtained. To form a uniform nanocomposite magnet structure, the as-quenched, rapidly solidified alloy should have a uniform quenching rate. For that purpose, the rapid cooling conditions need to be adjusted such that the thickness of the as-quenched rapidly solidified alloy has a standard deviation σ of 5 μm or less. To realize such rapid cooling, a melt spinning process or a melt-quenching process that uses a tundish with multiple tubular holes as disclosed in Japanese Patent Application Laid-Open Publication No. 2004-122230 can be used effectively. When any of these rapid cooling processes is carried out, a chill roller with a smooth surface is preferably used and the rapid cooling process is preferably performed within a low pressure atmosphere so as to minimize the absorption of the atmospheric gas into the roller.

Thereafter, by thermally treating the rapidly solidified alloy that has been made in this manner, the amorphous phases in the rapidly solidified alloy can be crystallized and a nanocomposite magnet with excellent magnetic properties can be obtained in the end. According to the present invention, by heating the rapidly solidified alloy, a nanocomposite magnet structure, including $R_2Fe_{14}B$-type compound phases with an average crystal grain size of 30 nm to 300 nm and α —Fe phases with an average crystal grain size of 1 nm to 20 nm, is completed through the heat treatment process. As a result, an iron-based rare-earth nanocomposite magnet, exhibiting magnetic properties including a coercivity of 400 kA/m or more and a remanence of 0.9 T or more, can be obtained.

Thus, in the iron-based rare-earth nanocomposite magnet of the present invention, the average crystal grain size of the $R_2Fe_{14}B$-type compound phases is larger than that of the α —Fe phases. In a preferred embodiment, the α —Fe phase of the very small size is present at the grain boundary triple point of the $R_2Fe_{14}B$-type compound phase.

Hereinafter, the difference in structure between the nanocomposite magnet of the present invention and the conventional nanocomposite magnet will be described with reference to FIG. 1.

The rectangular areas on the left-hand side of portions (a) through (d) of FIG. 1 schematically illustrate the nanocrystalline structures of rapidly solidified alloys, while those on their right-hand side schematically illustrate the nanocrystalline structures of thermally treated nanocomposite magnets.

More specifically, portions (a) through (d) of FIG. 1 illustrate a nanocomposite magnet according to the present invention, a conventional α —Fe/$R_2Fe_{14}B$ based nanocomposite magnet, a conventional α —Fe/$R_2Fe_{14}B$ based nanocomposite magnet including an additive Ti, and an iron-based boride/$R_2Fe_{14}B$ based nanocomposite magnet including an additive Ti, respectively.

According to the present invention, the α —Fe cannot be identified clearly in the rapidly solidified alloy but a structure in which $R_2Fe_{14}B$-type compound phases of a very small size are dispersed in amorphous phases is produced as shown in portion (a) of FIG. 1. Alternatively, α —Fe of a very small size may have been produced at this stage. This is because by adding Ti, the growth rate of the α —Fe phase will be restricted during the subsequent heat treatment process, and a structure in which α —Fe phases of a very small size (as indicated by solid circles in portion (a) of FIG. 1) are present at the grain boundary triple points of the $R_2Fe_{14}B$-type compound phases that have grown preferentially will be obtained when the heating process is finished.

In the conventional α —Fe/$R_2Fe_{14}B$ based nanocomposite magnet, the rapidly solidified alloy is almost totally amorphous as shown in portion (b) of FIG. 1. When the heating process is finished, a structure in which $R_2Fe_{14}B$-type compound phases and α —Fe phases of almost the same size are present as a mixture will be obtained.

It was reported that in the prior art, a metal element such as Ti should be added to the melt of a material alloy to reduce the sizes of the constituent phases of the nanocomposite magnet structure shown in portion (b) of FIG. 1. When such a metal element is added, a structure in which the sizes of the α —Fe phases (i.e., the black portions in portion (c) of FIG. 1) and the $R_2Fe_{14}B$-type compound phases (i.e., the white portions in portion (c) of FIG. 1) have been both reduced can be obtained as shown in portion (c) of FIG. 1 by controlling the conditions of the heating process.

In the iron-based boride/$R_2Fe_{14}B$ based nanocomposite magnet including an additive Ti, not the α —Fe/$R_2Fe_{14}B$ based nanocomposite magnet described above, $R_2Fe_{14}B$-type compound phases are produced in the rapidly solidified alloy as shown in portion (d) of FIG. 1. However, in the resultant structure, those $R_2Fe_{14}B$-type compound phases are surrounded by iron-based boride (Fe—B) phases thinly.

In the conventional α —Fe/$R_2Fe_{14}B$ based nanocomposite magnet, the size of the α —Fe phases cannot be made smaller than that of the $R_2Fe_{14}B$-type compound phases. Thus, in the known α —Fe/$R_2Fe_{14}B$ based nanocomposite magnet, the α —Fe phases and $R_2Fe_{14}B$-type compound phases have substantially the same average crystal grain size. Also, to improve the performance of the nanocomposite magnet, the size of the α —Fe phases needs to be reduced. Thus, a nanocomposite magnet, in which the sizes of the α —Fe phases (i.e., the black portions in portion (c) of FIG. 1) and the $R_2Fe_{14}B$-type compound phases (i.e., the white portions in portion (c) of FIG. 1) were both reduced uniformly by controlling the conditions of the rapid solidification process and heat treatment process to crystallize the material alloy, was reported as shown in portion (c) of FIG. 1.

Unlike these conventional nanocomposite magnets, the nanocomposite magnet of the present invention has a distinct structure in which α —Fe phases of a very small size are dispersed discretely on the grain boundary between $R_2Fe_{14}B$-type compound phases of a relatively large size, thus realizing excellent nanocomposite magnet performance. Such a structure is realized by not just adding Ti to the alloy but also dispersing the $R_2Fe_{14}B$-type compound phases of a small size intentionally in the as-quenched rapidly solidified alloy. As a result, the $R_2Fe_{14}B$-type compound phases will grow faster and earlier than the α —Fe phases and the α —Fe phases of a very small size will not be nucleated at the grain boundary triple points until the $R_2Fe_{14}B$-type compound phases have grown sufficiently.

In the iron-based boride/$R_2Fe_{14}B$ based nanocomposite magnet shown in portion (d) of FIG. 1, the iron-based boride (Fe—B) phases are present in the form of a film. On the other hand, according to the present invention, the α —Fe phases of a very small size are dispersed at the grain boundary triple points as shown in portion (a) of FIG. 1. The reason why the α —Fe phases are dispersed in this manner is not clear yet.

Hereinafter, a preferred embodiment of a method for producing an iron-based rare-earth nanocomposite magnet according to the present invention will be described.

First, a configuration for a melt-quenching machine for use in this preferred embodiment will be described with reference to FIG. 2.

[Melt Quenching Machine]

In this preferred embodiment, a material alloy is prepared by using a melt quenching machine such as that shown in FIG. 2. The alloy preparation process is performed within an inert atmosphere to prevent the material alloy, which includes rare-earth element R and Fe that are easily oxidizable, from being oxidized. The inert gas may be either a rare gas of helium or argon, for example, or nitrogen.

The machine shown in FIG. 2 includes material alloy melting and quenching chambers 1 and 2, in which a vacuum or an inert atmosphere is maintained at an adjustable pressure. Specifically, FIG. 2(a) illustrates an overall arrangement of the machine, while FIG. 2(b) illustrates a portion of the machine on a larger scale.

As shown in FIG. 2(a), the melting chamber 1 includes: a melt crucible 3 to melt, at an elevated temperature, a material 20 that has been mixed to have a desired magnet alloy composition; a reservoir 4 with a teeming nozzle 5 at the bottom; and a mixed material feeder 8 to supply the mixed material into the melt crucible 3 while maintaining an airtight condition. The reservoir 4 stores the melt 21 of the material alloy therein and is provided with a heater (not shown) to maintain the temperature of the melt teemed therefrom at a predetermined level.

The quenching chamber 2 includes a rotating chill roller 7 for quenching and solidifying the melt 21 that has been dripped through the teeming nozzle 5.

In this machine, the atmosphere and pressure inside the melting and quenching chambers 1 and 2 are controllable within prescribed ranges. For that purpose, atmospheric gas inlet ports 1b, 2b and 8b and outlet ports 1a, 2a and 8a are provided at appropriate positions of the machine. In particular, the gas outlet port 2a is connected to a pump to control the absolute pressure inside the quenching chamber 2 within a range of 30 kPa to the normal pressure (i.e., atmospheric pressure).

The melt crucible 3 may define a desired tilt angle to pour the melt 21 through a funnel 6 into the reservoir 4. The melt 21 is heated in the reservoir 4 by the heater (not shown).

The teeming nozzle 5 of the reservoir 4 is positioned on the boundary wall between the melting and quenching chambers 1 and 2 to drip the melt 21 in the reservoir 4 onto the surface of the chill roller 7, which is located under the nozzle 5. The orifice diameter of the teeming nozzle 5 may be 0.5 mm to 2.0 mm, for example. If the viscosity of the melt 21 is high, then the melt 21 cannot flow through the teeming nozzle 5 easily. In this embodiment, however, the pressure inside the quenching chamber 2 is kept lower than the pressure inside the melting chamber 1. Accordingly, an appropriate pressure difference is created between the melting and quenching chambers 1 and 2, and the melt 21 can be teemed smoothly.

To achieve a good thermal conductivity, the chill roller 7 may be made of Al alloy Cu alloy, carbon steel, brass, W, Mo or bronze. However, the roller 7 is preferably made of Cu, Fe or an alloy including Cu or Fe, because such a material realizes a sufficient mechanical strength at a reasonable cost. Also, if the chill roller is made of a material other than Cu or Fe, the resultant rapidly solidified alloy cannot come off the chill roller easily and might be wound around the roller. The chill roller 7 may have a diameter of 300 mm to 500 mm, for instance. The water-cooling capability of a water cooler provided inside the chill roller 7 is calculated and adjusted based on the latent heat of solidification and the volume of the melt teemed per unit time.

The machine shown in FIG. 2 can rapidly solidify 10 kg of material alloy in 10 to 20 minutes, for example. The rapidly solidified alloy obtained in this manner is in the form of an alloy thin strip (or alloy ribbon) 22 with a thickness of 10 μm to 300 μm and a width of 2 mm to 3 mm, for example.

[Melt Quenching Process]

First, the melt 21 of the material alloy, which is represented by the following general formula, is prepared and stored in the reservoir 4 of the melting chamber 1 shown in FIG. 2(a).

The alloy has a composition represented by the general formula: $T_{100-x-y-z-n}Q_xR_yTi_zM_n$, where T is either Fe alone or a transition metal element in which Fe is partially replaced by at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb. And the mole fractions x, y, z and n satisfy the inequalities of 5 at %$\leq$x$\leq$10 at %, 7 at %$\leq$y$\leq$10 at %, 0.1 at %$\leq$z$\leq$5 at % and 0 at %$\leq$n$\leq$10 at %, respectively.

Next, the melt 21 is dripped through the teeming nozzle 5 onto the chill roller 7 to contact with, and be quenched and solidified by, the chill roller 7 within a low-pressure Ar atmosphere. In this case, an appropriate rapid solidification technique, making the quenching rate controllable precisely, should be adopted.

In this preferred embodiment, the melt 21 is preferably quenched and solidified at a quenching rate of $1 \times 10^{4\circ}$ C./s to $1 \times 10^{6\circ}$ C./s, more preferably $3 \times 10^{4\circ}$ C./s to $1 \times 10^{6\circ}$ C./s, and even more preferably $1 \times 10^{5\circ}$ C./s to $1 \times 10^{6\circ}$ C./s.

A period of time during which the molten alloy 21 is quenched by the chill roller 7 is equivalent to an interval between a point in time the alloy contacts with the outer circumference of the rotating chill roller 7 and a point in time the alloy leaves the roller 7. In this period of time, the alloy has its temperature decreased to be a supercooled liquid. Thereafter, the supercooled alloy leaves the chill roller 7 and travels within the inert atmosphere. While the thin-strip alloy is traveling, the alloy has its heat dissipated into the atmospheric gas. As a result, the temperature of the alloy further drops. In this embodiment, the pressure of the atmospheric gas is 30 kPa to the atmospheric pressure. Thus, the heat of the alloy can be dissipated into the atmospheric gas even more effectively, and the $Nd_2Fe_{14}B$ compound can nucleate and grow finely and uniformly in the alloy. It should be noted that unless an appropriate amount Ti has been added to the material alloy, then the α—Fe phase nucleates and grows faster and earlier in the rapidly solidified alloy that has gone through the quenching process described above, thus growing the α—Fe excessively and deteriorating the magnetic properties of the resultant magnet.

In this preferred embodiment, the surface velocity of the roller is adjusted to fall within the range of 10 m/s to 30 m/s (more preferably 14 m/s to 2.5 m/s and even more preferably, 18 m/s to 22 m/s) and the pressure of the atmospheric gas is set to 30 kPa or more to increase the secondary cooling effects caused by the atmospheric gas. In this manner, a rapidly solidified alloy, including at least 20 volume % of $R_2Fe_{14}B$ type compound phases with an average crystal grain size of as small as about 80 nm or less, is obtained. Such a crystallized layer is formed substantially uniformly on the free cooling side of the rapidly solidified alloy thin strip. In addition, another crystallized layer may be formed thinly on the uppermost surface of the rapidly solidified alloy thin strip that has been in contact with the surface of the chill roller. Meanwhile, the intermediate portion between these two crystallized layers is in an amorphous or quasi-amorphous state.

[Heat Treatment]

In this preferred embodiment, the rapidly solidified alloy is thermally treated within an argon atmosphere. Preferably, the alloy is heated at a temperature rise rate of 5° C./s to 20° C./s, maintained at a temperature of 550° C. to 850° C. for 30 seconds to 20 minutes, and then cooled to room temperature. This heat treatment results in nucleation and/or crystal growth of metastable phases in a remaining amorphous phase, thus forming a nanocomposite crystalline structure. According to the present invention, the nanocrystalline $Nd_2Fe_{14}B$ phase already accounts for at least 20 volume % of the as-cast alloy that has just started being thermally treated. Thus, $\alpha$—Fe and other crystalline phases will not increase their sizes too much and the respective constituent phases other than the nanocrystalline $Nd_2Fe_{14}B$ phase (i.e., soft magnetic phases) will be dispersed finely and uniformly. The resultant nanocomposite magnet that has gone through this heat treatment has a nanocrystalline structure in which the grain boundary between the $Nd_2Fe_{14}B$ crystalline phases is mostly composed of $\alpha$—Fe, which should account for at least 5 vol % of the entire magnet. Thus, the magnet as a whole can exhibit increased remanence.

If the heat treatment temperature were lower than 550° C., then a lot of amorphous phases might remain even after the heat treatment and the resultant coercivity could not reach the desired level depending on the conditions of the quenching process. On the other hand, if the heat treatment temperature exceeded 850° C., the grain growth of the respective constituent phases would advance too much, thus decreasing the remanence $B_r$ and deteriorating the loop squareness of the demagnetization curve. For these reasons, the heat treatment temperature is preferably 550° C. to 850° C., more preferably 570° C. to 820° C.

To prevent the alloy from being oxidized, the heat treatment is preferably conducted within an inert atmosphere. The heat treatment may also be performed within a vacuum of 0.1 kPa or less.

The rapidly solidified alloy yet to be heat-treated may include metastable phases such as $Fe_3B$, $Fe_{23}B_6$ and $R_2Fe_{23}B_3$ phases in addition to the $R_2Fe_{14}B$-type compound and amorphous phases. In that case, when the heat treatment is finished, the $R_2Fe_{23}B_3$ phase will have disappeared. Instead, crystal grains of an iron-based boride (e.g., $Fe_{23}B_6$), exhibiting a saturation magnetization that is equal to, or even higher than, that of the $R_2Fe_{14}B$ phase, or $\alpha$—Fe phase can be grown.

After the heat treatment, the $R_2Fe_{14}B$-type compound phases need to have an average crystal grain size of less than 300 nm, which is a single magnetic domain size. The $R_2Fe_{14}B$-type compound phases preferably have an average crystal grain size of 30 nm to 150 nm, more preferably 30 nm to 100 nm, to increase the coercivity and improve the loop squareness of the demagnetization curve. On the other hand, if the $\alpha$—Fe phases had an average crystal grain size of more than 20 nm, then the exchange interactions among the respective constituent phases would weaken and $\alpha$—Fe particles with a multiple magnetic domain structure, not the single domain structure, would produce in increasing numbers, thus deteriorating the loop squareness of the demagnetization curve and decreasing magnetization, $B_r$, and $(BH)_{max}$. Nevertheless, if the average crystal grain size of these phases were less than 1 nm, then a high coercivity could not be achieved anymore. In view of these considerations, the $\alpha$—Fe phases preferably have an average crystal grain size of 1 nm to 20 nm.

As can be seen, according to the present invention, the average crystal grain size of the $R_2Fe_{14}B$-type compound phases is greater than that of the $\alpha$—Fe phases and the ratio of the former to the latter is 1.5 or more. This ratio is preferably 2.0 or more.

It should be noted that the thin strip of the rapidly solidified alloy could be coarsely cut or coarsely pulverized before subjected to the heat treatment. When the heat treatment is finished, the resultant magnet is finely pulverized to make a magnet powder. Then, various types of bonded magnets can be made from this magnet powder by performing known process steps on the powder. In making a bonded magnet, the magnet powder of the iron-based rare-earth alloy is mixed with an epoxy or nylon resin binder and then molded into a desired shape. In this case, a magnet powder of any other type (e.g., an Sm—Fe—N based magnet powder or hard ferrite magnet powder) may be mixed with the nanocomposite magnet powder.

[Why this Composition is Preferred]

As described above, the composition of an iron-based rare-earth nanocomposite magnet according to the present invention is represented by the formula: $T_{100-x-y-z-n}Q_xR_yTi_zM_n$, where T is either Fe alone or a transition metal element including Fe and at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb. And the mole fractions x, y, z and n satisfy the inequalities of 5 at %$\leq$x$\leq$10 at %, 7 at %$\leq$y$\leq$10 at % (preferably 8 at %$\leq$y$\leq$10 at %), 0.1 at %$\leq$z$\leq$5 at % (preferably 0.5 at %$\leq$z$\leq$4 at %) and 0 at %$\leq$n$\leq$10 at %, respectively.

Q is either B (boron) only or a combination of B and C (carbon). The atomic percentage ratio of C to Q is preferably 0.5 or less.

With no Ti added, if the mole fraction x of Q were less than 7 at %, then the amorphous phases would be produced at a much lower rate. As a result, no uniform nanocrystalline metal structure could be produced and a remanence $B_r$ of 0.9 T or more could not be achieved. According to the present invention, by adding Ti, the amorphous phases can be produced at an increased rate, and therefore, the mole fraction x of Q has a lower limit of 5 at %. On the other hand, if the mole fraction x of Q exceeded 10 at %, then the percentage of the $\alpha$—Fe phase, which has a higher saturation magnetization than any other constituent phase, would decrease and soft magnetic phases such as $Fe_3B$, $Fe_{3.5}B$ and $Fe_{23}B_6$ would nucleate and a remanence $B_r$ of 0.9 T or more could not be achieved. In view of these considerations, the mole fraction x of Q is preferably set to fall within the range of 5 at % to 10 at %, more preferably 5.5 at % to 9.5 at %, and even more preferably 5.5 at % to 9.0 at %. The upper limit of a further preferred range of the mole fraction x is 8 at %. A portion (up to 50 at %) of B may be replaced with carbon (C) because the magnetic properties and the metal structure will not be affected in that case.

R is at least one element selected from the group consisting of the rare-earth elements (including Y). Preferably, R includes substantially no La or Ce, because the presence of La or Ce would decrease the coercivity and the loop squareness of the demagnetization curve. However, there will be no problem of degrading the magnetic properties if very small amounts (i.e., 0.5 at % or less) of La and Ce are included as inevitable impurities. Therefore, if the content of La or Ce is 0.5 at % or less, then the magnet may be regarded as including substantially no La or Ce.

More particularly, R preferably includes Pr or Nd as an indispensable element, a portion of which may be replaced with Dy and/or Tb. If the mole fraction y of R were less than 7 at %, then compound phases having the nanocrystalline $R_2Fe_{14}B$-type structure, which contribute to expressing coercivity, would not crystallize sufficiently and a coercivity $H_{cJ}$ of 400 kA/m or more could not be realized. On the other hand, if the mole fraction y of R exceeded 10 at %, then the percentages of the iron-based borides and $\alpha$—Fe with ferromagnetic properties would both decrease. For these reasons, the mole fraction y of the rare-earth element R is preferably 7 at % to 10 at % (e.g., 7.5 at % to 9.8 at %), more preferably 8 at % to 9.8 at %, and most preferably 8.2 at % to 9.7 at %.

To achieve the above-described effects, Ti is an indispensable element. The additive Ti increases the coercivity $H_{cJ}$, remanence $B_r$ and maximum energy product $(BH)_{max}$ and improves the loop squareness of the demagnetization curve.

If the mole fraction z of Ti were less than 0.1 at %, then the above effects would not be achieved fully even though Ti is added. Nevertheless, if the mole fraction z of Ti exceeded 5 at %, then the volume percentage of the amorphous phases, remaining even in the alloy that has been heated and crystallized, would increase so much as to decrease the remanence $B_r$ easily. In view of these considerations, the mole fraction z of Ti is preferably 0.1 at % to 5 at %. The lower limit of a more preferable z range is 0.5 at % and the upper limit thereof is 4 at %. The lower limit of an even more preferable z range is 1 at %.

The balance of the magnet, other than the elements described above, may be a transition metal element T, which consists mostly of Fe. Alternatively, one or two transition metal elements T, selected from the group consisting of Co and Ni, may be substituted for a portion of Fe, because the desired hard magnetic properties are achievable in that case, too. However, if more than 50% of Fe were replaced with Co and/or Ni, then a high remanence $B_r$ of 0.5 T or more could not be realized. For that reason, the percentage of Fe replaced is preferably from 0% to 50%. Also, by substituting Co for a portion of Fe, the loop squareness of the demagnetization curve improves and the Curie temperature of the $R_2Fe_{14}B$ phase increases, thus improving the thermal resistance. Furthermore, by adding Co, the molten alloy being quenched has a decreased viscosity, and therefore, the melt quenching process can be performed with good stability. The percentage of Fe that is replaceable with Co is preferably 0.5% to 15%.

Optionally, one, two or more additives M, selected from the group consisting of Al, Si, V, Cr, Mn, Cu, Zn, Ga, Zr, Nb, Mo, Ag, Hf, Ta, W, Pt, Au and Pb, may be added. By adding these elements, not only improvement of magnetic properties but also expansion of the best heat treatment temperature range will be achieved as well. However, if the mole fraction of M exceeded 10 at %, then the magnetization would decrease. For that reason, the mole fraction n of M should fall within the range of 0 at % to 10 at %, more preferably 0.1 at % to 5 at %.

EXAMPLES

Example 1

For each of Samples Nos. 1 through 21 having the compositions shown in the following Table 1, Nd, Pr, B, C, Ti, Cu, Ga, Co, Zr, V, Nb and Fe were weighed so that the mixture had a total weight of 30 g and then the mixture was put into a nozzle of transparent quartz having an orifice with a diameter of 0.8 mm$\phi$ at the bottom.

Thereafter, the materiel in the nozzle was melted by an inductive heating process within an Ar atmosphere. When the temperature of the resultant molten alloy reached 1,400° C., the molten alloy in the nozzle was pressurized with an argon gas at 30 kPa, thereby ejecting the molten alloy through the orifice at the bottom of the nozzle onto the surface of the chill roller.

The chill roller was rotated at a high velocity while being cooled inside so that the outer circumference thereof would have its temperature maintained around at room temperature. Accordingly, the molten alloy, which had been ejected through the orifice, contacted with the surface of the roller to have its heat dissipated therefrom while being forced to rapidly move in the surface velocity direction. The chill roller had a surface velocity Vs of 20 m/s.

In this manner, a thin strip of rapidly solidified alloy with an average thickness of 40 µm to 50 µm and a width of 0.9 mm to 2.0 mm was made. As a result of an analysis using a powder X-ray diffraction (powder XRD) analyzer, it was confirmed that the rapidly solidified alloy thus obtained had a quenched alloy structure in which amorphous phases and crystalline phases that would be $Nd_2Fe_{14}B$ and $\alpha$—Fe phases coexisted. It was also confirmed that the thickness of the resultant rapidly solidified alloy thin strip had a standard deviation a of σ µm or less everywhere.

Next, the alloy thin strip thus obtained was cut into a number of flakes, each having a length of about 20 mm, which were then thermally treated and crystallized by maintaining its temperature at 630° C. to 700° C. for 10 minutes.

Figure 3:
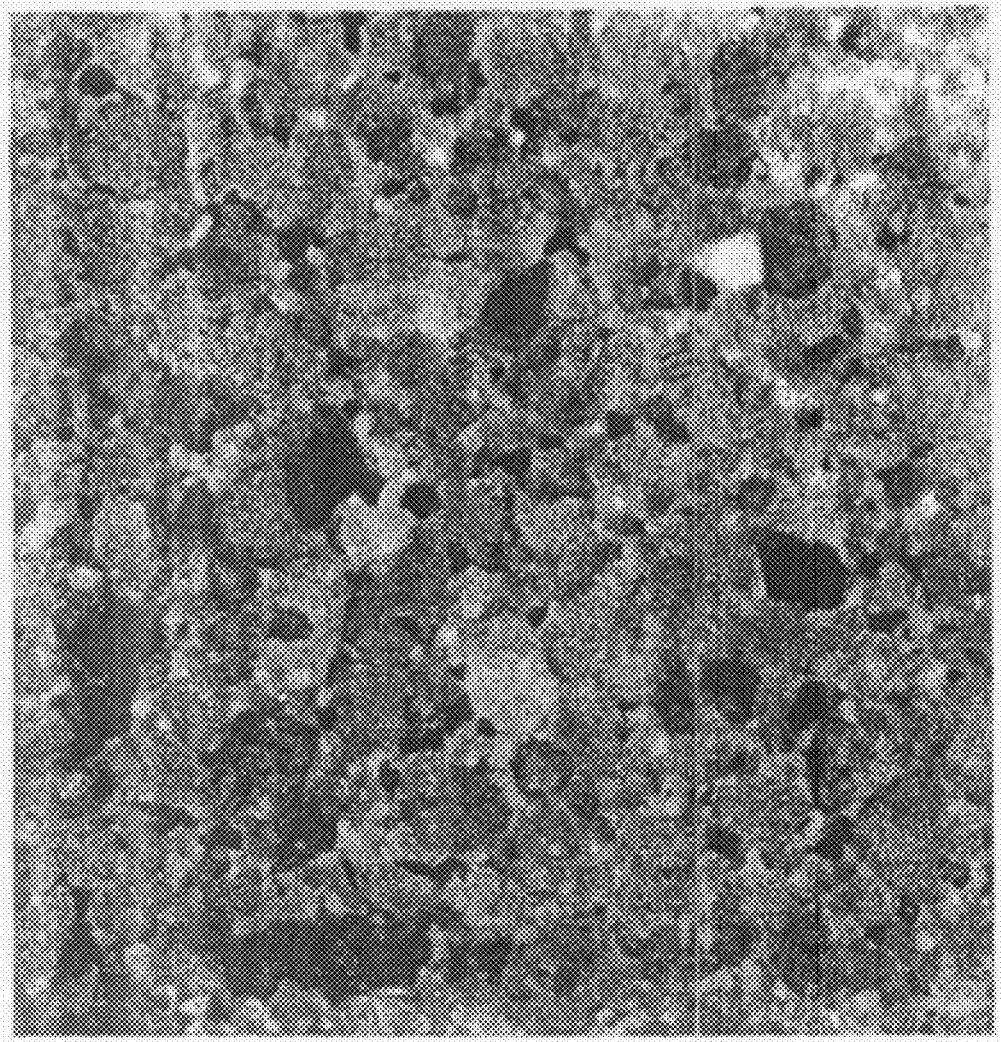
FIG. 3 is a transmission electron microscope (TEM) photograph showing a cross-sectional structure of a specific example of the present invention.

When the crystalline phases of the thermally treated rapidly solidified alloy thin strip were analyzed by a powder XRD, it was discovered that Samples Nos. 1 to 21 had a metal structure consisting essentially of $Nd_2Fe_{14}B$ and $\alpha$—Fe phases (but some of them included Fe—B phases such as $Fe_3B$ and $Fe_{23}B_6$ phases). Also, when the fine metal structure was observed with a transmission electron microscope, a nanocomposite magnet structure, including $Nd_2Fe_{14}B$ phases with an average crystal grain size of 30 nm to 100 nm and $\alpha$—Fe phases with as small an average crystal grain size as 1 nm to 20 nm in the grain boundary region (with a thickness of several nm to 20 nm) between the $Nd_2Fe_{14}B$ crystal grains (particularly in the vicinity of the grain boundary triple points), was identified. FIG. 3 is a transmission electron microscope (TEM) photograph showing a cross section of Sample No. 19. As can be seen from this photograph, the $\alpha$—Fe phase accounted for at least 5 vol % of the overall magnet. The magnetic properties of the thermally treated and crystallized thin strip of the rapidly solidified alloy were measured at room temperature using a vibrating sample magnetometer and are shown in Table 2.

It should be noted that: if the surface velocity Vs of the chill roller was changed within the range of 14 m/s to 18 m/s during the quenching process, a rapidly solidified alloy thin strip with a thickness of 52 µm to 74 µm was obtained. Thus, it was confirmed that when the surface velocity Vs of the chill roller decreased, the resultant rapidly solidified alloy thin strip had an increased thickness but its standard deviation σ still fell within the range of 2.2 to 4.2.

Comparative Examples 30 g of material, in which Nd, B, Nb, Cr and Fe were mixed together so as to have one of the alloy compositions Nos. 22 to 30 shown in Table 1, was put into a nozzle of transparent quartz having an orifice with a diameter of 0.8 mm$\phi$ at the bottom. Thereafter, the material in the nozzle was melted by an inductive heating process within an Ar atmosphere. When the temperature of the resultant molten alloy reached 1,400° C., the molten alloy in the nozzle was pressurized at 30 kPa, thereby ejecting the molten alloy through the orifice at the bottom of the nozzle onto the surface of the chill roller rotating at a velocity Vs of 20 m/s. In this manner, the molten alloy was quenched to make a rapidly solidified alloy thin strip with a width of 0.9 mm to 1.1 mm and an average thickness of 40 µm to 50 µm.

Next, the alloy thin strip thus obtained was cut into a number of flakes, each having a length of about 20 mm, which were then thermally treated and crystallized by maintaining its temperature at 630° C. to 700° C. for 10 minutes.

TABLE 1

| | | Alloy composition (at %) | | | | | | |
|---|---|---|---|---|---|---|---|---|
| | | R | | T | | Q | | |
| | | Nd | Pr | Fe | Co | B | C | Ti | M |
| EXAMPLES | 1 | 10 | 0 | bal. | 0 | 6 | 1 | 3 | 0 |
| | 2 | 9 | 0 | bal. | 8 | 5.5 | 0.5 | 1 | 0 |
| | 3 | 9 | 0 | bal. | 8 | 6 | 0 | 1 | 0 |
| | 4 | 8.25 | 0 | bal. | 8 | 5.5 | 0.5 | 1 | 0 |
| | 5 | 9 | 0 | bal. | 0 | 5.5 | 0.5 | 1 | Cu 0.25 |
| | 6 | 9 | 0 | bal. | 0 | 5.5 | 0.5 | 1 | Ga 0.5 |
| | 7 | 9 | 0 | bal. | 0 | 5.5 | 0.5 | 1 | Nb 0.5 |
| | 8 | 9 | 0 | bal. | 8 | 5.5 | 0.5 | 0.5 | V 0.5 |
| | 9 | 9 | 0 | bal. | 8 | 5.5 | 0.5 | 0.5 | Zr 0.5 |
| | 10 | 9 | 0 | bal. | 8 | 5 | 0.5 | 0.5 | Nb 0.5 |
| | 11 | 0 | 9 | bal. | 8 | 5.5 | 0.5 | 2 | 0 |
| | 12 | 4.12 | 4.13 | bal. | 8 | 5.5 | 0.5 | 3 | 0 |
| | 13 | 0 | 8.25 | bal. | 8 | 5.5 | 0.5 | 1 | 0 |
| | 14 | 7 | 0 | bal. | 0 | 7 | 0 | 1 | 0 |
| | 15 | 7.5 | 0 | bal. | 0 | 9 | 0 | 3 | 0 |
| | 16 | 8.5 | 0 | bal. | 0 | 7.5 | 0 | 1 | 0 |
| | 17 | 9.8 | 0 | bal. | 0 | 7.5 | 0 | 2 | 0 |
| | 18 | 9 | 0 | bal. | 3 | 8 | 0 | 2 | 0 |
| | 19 | 9 | 0 | bal. | 0 | 5.5 | 0.5 | 1 | 0 |
| | 20 | 9 | 0 | bal. | 8 | 6 | 0 | 0.5 | 0 |
| | 21 | 9 | 0 | bal. | 8 | 6 | 0 | 0.3 | 0 |
| COMP EXAM | 22 | 9 | 0 | bal. | 0 | 5 | 0 | 0 | 0 |
| | 23 | 8 | 0 | bal. | 0 | 5 | 0 | 0 | 0 |
| | 24 | 7 | 0 | bal. | 0 | 5 | 0 | 0 | 0 |
| | 25 | 8 | 0 | bal. | 0 | 6 | 0 | 0 | 0 |
| | 26 | 8 | 0 | bal. | 0 | 9 | 0 | 0 | 0 |
| | 27 | 7 | 0 | bal. | 0 | 7 | 0 | 0 | 0 |
| | 28 | 8 | 0 | bal. | 0 | 10 | 0 | 0 | 0 |
| | 29 | 7 | 0 | bal. | 0 | 7 | 0 | 0 | Nb 1 |
| | 30 | 7 | 0 | bal. | 0 | 7 | 0 | 0 | Cr 1 |

When the crystalline phases of the thermally treated rapidly solidified alloy thin strip were analyzed by a powder XRD, it was discovered that Samples Nos. 22 to 30 had a metal structure consisting essentially of $Nd_2Fe_{14}B$ and α—Fe phases. Also, when the fine metal structure was observed with a transmission electron microscope, a fine metal structure, including $Nd_2Fe_{14}B$ phases with an average crystal grain size of nm to 100 nm and α—Fe phases, was identified. The magnetic properties of the thermally treated and crystallized thin strip of the rapidly solidified alloy were measured at room temperature using a vibrating sample magnetometer and are also shown in Table 2.

TABLE 2

| | | Magnetic properties | | |
|---|---|---|---|---|
| | | $B_r$ (mT) | $H_{cJ}$ (kA/m) | $(BH)_{max}$ (kJ/m³) |
| EXAMPLES | 1 | 864 | 871 | 118 |
| | 2 | 1,035 | 593 | 149 |
| | 3 | 1,013 | 579 | 144 |
| | 4 | 1,043 | 502 | 147 |
| | 5 | 986 | 574 | 138 |
| | 6 | 973 | 595 | 137 |
| | 7 | 983 | 630 | 141 |
| | 8 | 995 | 576 | 137 |
| | 9 | 982 | 551 | 140 |
| | 10 | 1,023 | 569 | 147 |
| | 11 | 997 | 613 | 146 |
| | 12 | 1,045 | 515 | 145 |
| | 13 | 1,060 | 541 | 151 |
| | 14 | 1,076 | 420 | 130 |
| | 15 | 910 | 434 | 115 |
| | 16 | 980 | 457 | 120 |
| | 17 | 950 | 783 | 132 |
| | 18 | 950 | 740 | 135 |
| | 19 | 992 | 581 | 141 |
| | 20 | 970 | 569 | 118 |
| | 21 | 945 | 534 | 111 |
| COMP EXAM | 22 | 902 | 418 | 74 |
| | 23 | 960 | 397 | 84 |
| | 24 | 946 | 265 | 58 |
| | 25 | 913 | 379 | 79 |
| | 26 | 917 | 405 | 97 |
| | 27 | 1,035 | 353 | 99 |
| | 28 | 874 | 417 | 91 |
| | 29 | 1,026 | 409 | 117 |
| | 30 | 1,046 | 395 | 112 |

As is clear from Tables 1 and 2, excellent magnetic properties, including a coercivity of 400 kA/m or more and a remanence of 0.9 T or more, were realized in the specific examples of the present invention, whereas the remanence was lower than 0.9 T in the comparative examples.

According to the present invention, an iron-based rare-earth nanocomposite magnet, exhibiting magnetic properties including a coercivity of 400 kA/m or more and a remanence of T or more, is provided and can be used effectively in small-sized motors, sensors and other electronic devices that need high-remanence magnets.

The invention claimed is:

1. An iron-based rare-earth nanocomposite magnet having a composition represented by the formula: $T_{100-x-y-z-n}Q_xR_yTi_zM_n$, where T is either Fe alone or Fe in combination with at least one element selected from the group consisting of Co and Ni; Q is at least one element selected from the group consisting of B and C; R is at least one rare-earth element including substantially no La or Ce; and M is at least one metal element selected from the group consisting of Al, Si, V, Cr, Mn, Cu, Zn, Ga, Zr, Nb, Mo, Ag, Hf, Ta, W, Pt, Au and Pb, the mole fractions x, y, z and n satisfying the inequalities of 5 at % ≤ x ≤ 8 at %, 7 at % ≤ y ≤ 10 at %, 0.1 at % ≤ z ≤ 5 at % and 0 at % ≤ n ≤ 10 at %, respectively, wherein the magnet includes $R_2T_{14}Q$ compound phases and α—Fe phases that form a magnetically coupled nanocomposite magnet structure, and wherein the $R_2T_{14}Q$ compound phases have an average crystal grain size of 20 nm or more and the α—Fe phases are present at grain boundary triple points in a grain boundary region between the $R_2T_{14}Q$ compound phases, the grain boundary region having a thickness of 20 nm or less, wherein a ratio of the average crystal grain size of the $R_2T_{14}Q$ compound phases relative to that of the α—Fe phases is 2.0 or more, and wherein the magnet has magnetic properties including a coercivity of at least 400 kA/m and a remanence of at least 0.9 T.

2. The iron-based rare-earth nanocomposite magnet of claim 1, wherein the $R_2T_{14}Q$ compound phases have an average crystal grain size of 30 nm to 300 nm and the α—Fe phases have an average crystal grain size of 1 nm to 20 nm.

3. The iron-based rare-earth nanocomposite magnet of claim 1, wherein the α—Fe phases account for at least 5 vol % of the overall magnet.

4. A bonded magnet including a powder of the iron-based rare-earth nanocomposite magnet of claim 1.

5. A method for producing an iron-based rare-earth nanocomposite magnet, the method comprising the steps of:

preparing a molten alloy having a composition represented by the formula: $T_{100-x-y-z-n}Q_xR_yTi_zM_n$, where T is either Fe alone or Fe in combination with at least one element selected from the group consisting of Co and Ni; Q is at least one element selected from the group consisting of B and C; R is at least one rare-earth element including substantially no La or Ce;

and M is at least one metal element selected from the group consisting of Al, Si, V, Cr, Mn, Cu, Zn, Ga, Zr, Nb, Mo, Ag, Hf, Ta, W, Pt, Au and Pb, the mole fractions x, y, z and n satisfying the inequalities of 5 at %≦x≦8 at %, 7 at %≦y≦10 at %, 0.1 at %≦z≦5 at % and 0 at %≦n≦10 at %, respectively;

rapidly cooling and solidifying the molten alloy to make a rapidly solidified alloy including at least 20 vol % of $R_2T_{14}Q$ compound phases with an average crystal grain size of 80 nm or less; and heating the rapidly solidified alloy, thereby making an iron-based rare-earth nanocomposite magnet including the $R_2T_{14}Q$ compound phases and α—Fe phases that form a magnetically coupled nanocomposite magnet structure, where the $R_2T_{14}Q$ compound phases have an average crystal grain size of 20 nm or more, the α—Fe phases are present at grain boundary triple points in a grain boundary region between the $R_2T_{14}Q$ compound phases, the grain boundary region having a thickness of 20 nm or less, wherein a ratio of the average crystal grain size of the $R_2T_{14}Q$ compound phases relative to that of the α—Fe phases is 2.0 or more, and the magnet has magnetic properties including a coercivity of at least 400 kA/m and a remanence of at least 0.9 T.

6. The method of claim 5, wherein the $R_2T_{14}Q$ compound phases have an average crystal grain size of 30 nm to 300 nm and the α—Fe phases have an average crystal grain size of 1 nm to 20 nm.

7. The method of claim 5, wherein the step of rapidly cooling includes quenching and solidifying the molten alloy to make a rapidly solidified alloy with an average thickness of 50 μm to 300 μm and with a thickness standard deviation σ of 5 μm or less.

* * * * *